(12) United States Patent
Griffin et al.

(10) Patent No.: US 8,558,713 B2
(45) Date of Patent: Oct. 15, 2013

(54) WEIGHT BASED VEHICLE SEAT OCCUPANT DETECTION DEVICE WITH COMPENSATION FOR SEAT ORIENTATION ANGLE

(75) Inventors: Dennis P. Griffin, Noblesville, IN (US); Andrew H. Curtis, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 429 days.

(21) Appl. No.: 12/938,757

(22) Filed: Nov. 3, 2010

(65) Prior Publication Data

US 2012/0105241 A1 May 3, 2012

(51) Int. Cl.
G08B 21/00 (2006.01)

(52) U.S. Cl.
USPC ........... 340/667; 340/666; 340/436; 340/438; 340/561; 701/29.6; 701/31.4; 701/33.6; 701/34.3; 701/36; 324/662; 324/663

(58) Field of Classification Search
USPC .............. 340/667, 666, 436, 438, 547.1, 561; 701/29.6, 31.4, 33.6, 34.3, 36; 324/662, 663
See application file for complete search history.

(56) References Cited

U.S. PATENT DOCUMENTS

| 5,975,568 | A | 11/1999 | Speckhart et al. |
| 6,043,736 | A * | 3/2000 | Sawahata et al. ............. 340/438 |
| 6,989,496 | B2 * | 1/2006 | Desrochers et al. .......... 177/144 |
| 2003/0149517 | A1 * | 8/2003 | Murphy et al. ................. 701/45 |
| 2010/0324774 | A1 * | 12/2010 | Bouni et al. .................... 701/29 |

* cited by examiner

*Primary Examiner* — Tai T Nguyen
(74) *Attorney, Agent, or Firm* — Lawrence D. Hazelton

(57) ABSTRACT

A weight based occupant detection device that includes a weight sensing device installed in a vehicle seat in a manner effective to sense weight on a seating surface. The weight sensing device is configured to output a weight signal indicative of an occupant weight of a seat occupant residing on the vehicle seat. The occupant detection device also includes a seat orientation angle sensing device that is configured to output an orientation angle signal indicative of a seat orientation angle. The occupant detection device may also include an accelerometer for sensing vertical acceleration of the vehicle seat, and a seat backrest angle device for measuring the angle of the seat backrest. The occupant detection device compensates a signal from the weight sensing device for errors caused by seat orientation, seat vertical acceleration and seat backrest angle.

16 Claims, 3 Drawing Sheets

WEIGHT BASED VEHICLE SEAT OCCUPANT DETECTION DEVICE WITH COMPENSATION FOR SEAT ORIENTATION ANGLE

TECHNICAL FIELD OF INVENTION

The invention generally relates to vehicle occupant detection systems, and more particularly relates to a device in a vehicle seat configured to compensate an estimate of occupant weight of an occupant residing on the vehicle seat based on a seat orientation angle of the vehicle seat.

BACKGROUND OF INVENTION

Many vehicles, in particular automobiles, are equipped with occupant detection devices so occupant protection devices such as airbags can be enabled or disabled based on who or what is occupying a seat in the vehicle. For example, if a seat is empty, or occupied by a small child, it may be desirable to reduce the deployment force or disable an airbag for that seat to prevent airbag deployment if the vehicle is involved in a collision. One way to estimate the size of a seat occupant is to equip the seat with a device that estimates occupant weight.

It has been observed that changes in seat orientation angle relative to the vehicle and/or the direction of the force of gravity, and changes in vehicle orientation angle relative to the direction of the force of gravity, may change the apparent weight of an occupant indicated by the device estimating occupant weight. As used herein, seat orientation angle means a difference between the forward/backward tilting (pitch angle) of the seat and/or left/right tilting (roll angle) of the seat, relative to some reference position and the direction of the force of gravity. Variations in seat/vehicle orientation angle change the occupant's force vector due to gravity with respect to the weight sensor. Also, the occupant weight can be 'off-loaded' from the weight sensor to other areas of the seat such as the edges of the seat, or the back-rest if the seat orientation angle changes. In addition, up/down motion (heave) induced by vehicle movement as the vehicle travels may also change the apparent weight of an occupant. According to some observations, the effects of seat orientation angle can cause a 10% error of full scale in weight estimation. The effects of heave may add to the problem. In one situation, the effects of seat orientation angle and heave can make distinguishing $5^{th}$ percentile adults (small adults) from children difficult.

SUMMARY OF THE INVENTION

The invention described herein estimates an occupant weight of an occupant residing on vehicle seat from a signal indicating the occupant weight, and then corrects or compensates the indicated occupant weight for a difference of a seat orientation angle relative to a reference seat orientation angle or for vertical acceleration of the vehicle seat.

In accordance with one embodiment of this invention, a weight based occupant detection device configured to be installed in a vehicle seat is provided. The device includes a weight sensing means and a seat orientation angle sensing means. The weight sensing means is installed in a vehicle seat in a manner effective to sense weight on the seating surface. The weight sensing means is configured to output a weight signal indicative of an occupant weight of a seat occupant residing on the vehicle seat. The seat orientation angle sensing means is configured to output an orientation angle signal indicative of a seat orientation angle.

In another embodiment of the present invention, a vehicle seat is provided. The vehicle seat includes a seat cushion, a weight sensing means, and a seat orientation angle sensing means. The seat cushion is configured to define a seating surface. The weight sensing means is installed in the vehicle seat in a manner effective to sense weight on the seating surface. The weight sensing means is configured to output a weight signal indicative of an occupant weight of a seat occupant residing on the vehicle seat. The seat orientation angle sensing means is configured to output an orientation angle signal indicative of a seat orientation angle. The orientation angle signal is used to compensate the weight signal to estimate an occupant weight value.

In another embodiment of the present invention, a method of operating a weight based occupant detection device provided. The method includes the step of receiving an indication of an occupant weight from a weight sensing means installed in a vehicle seat. The method also includes the step of receiving an indication of a seat orientation angle of the vehicle seat. The method also includes the step of estimating an occupant weight of an occupant residing on the vehicle seat based on the indication of occupant weight and the indication of a seat orientation angle. The orientation angle signal is used to compensate the weight signal to estimate an occupant weight value.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
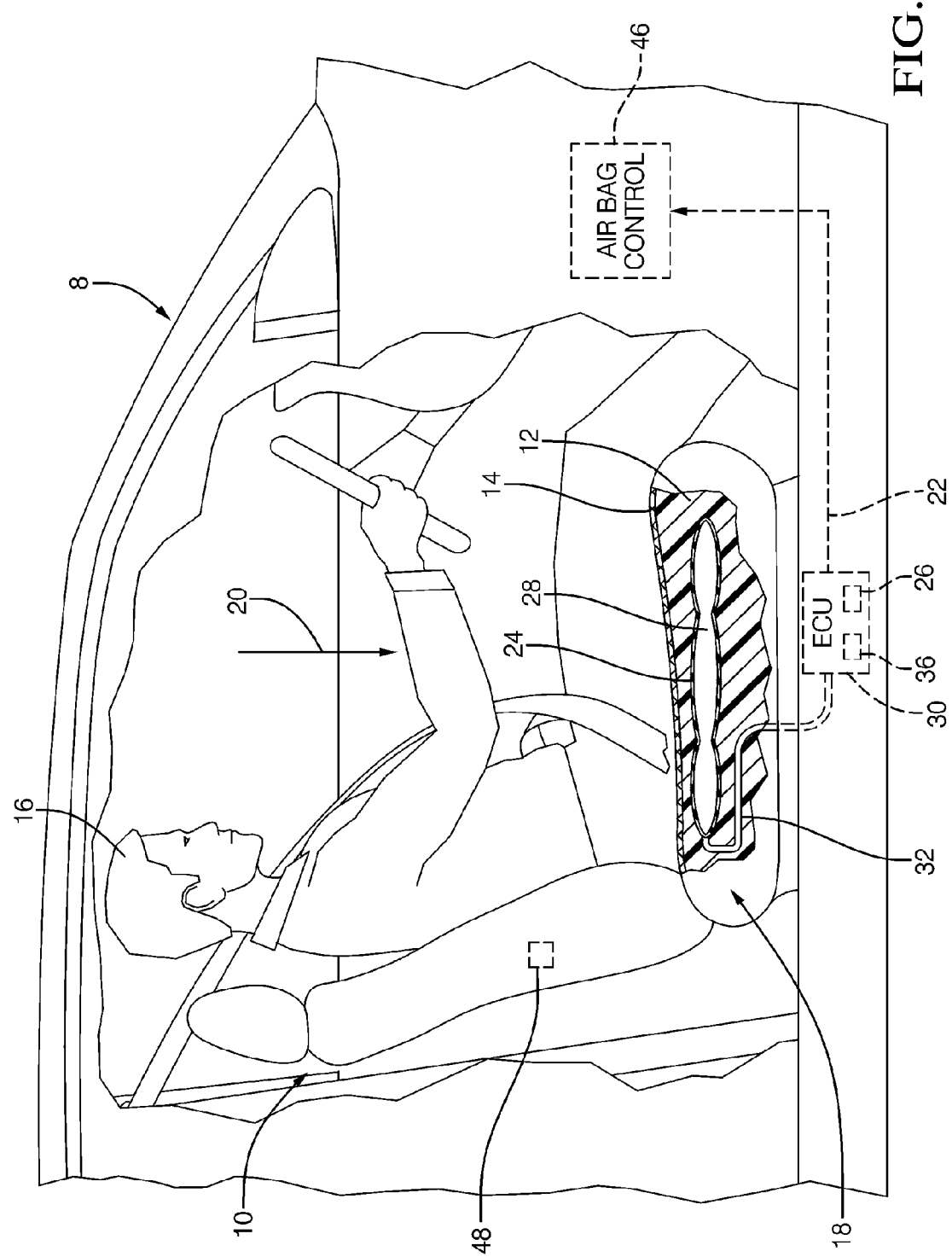
FIG. 1 is a cross sectional view of a vehicle seat equipped with an occupant detection device in accordance with one embodiment.

In accordance with an embodiment, FIG. 1 illustrates a vehicle seat 10 in a vehicle 8. The vehicle seat 10 includes a seat cushion 12 configured to define a seating surface 14 suitable for a seat occupant 16 to reside upon. The seat cushion 12 may be formed of a compressible foam or the like having mechanical properties suitable for sitting upon. The seating surface 14 may include a layer of cloth, leather, or other suitable material to make the vehicle seat 10 appear attractive and protect the material forming the seat cushion 12 from damage.

The vehicle seat 10 may also include a weight sensing means 18 installed in the vehicle seat 10 in a manner effective to sense weight of a seat occupant 16 on the seating surface 14. This weight is indicated by arrow 20, hereafter weight 20, or occupant weight 20. The weight sensing means 18 is configured to output a weight signal 22 indicative of an occupant weight 20 of a seat occupant 16 residing on the vehicle seat 10. The weight signal may convey the weight 20 or the occupant 16, or may convey a classification of the occupant 16, for example classifying the occupant 16 as an adult or a child. In one embodiment, the weight sensing means 18 may include a bladder 24 and a pressure sensor 26. The bladder 24 is preferably located proximate to the seating surface so that as a person sits on the seat assembly 10 the bladder 24 is subject to sufficient force or weight 20 to cause a change in the fluid pressure within the bladder 24. The bladder 24 is configured to define a cavity 28. The embodiment shown in FIG. 1 has multiple cavities, but it will be appreciated that other configurations of bladder 24 are possible, including a configuration having a single cavity. Material selected to form the bladder 24 needs to retain a fluid and pressurize the fluid in response to an occupant weight 20 upon the bladder 24. A non-limiting example of a material suitable to form the bladder 24 is thermoplastic polyurethane such as Pellethane sold by the Lubrizol Corporation. A non-limiting example of a material suitable for use as the fluid in the bladder 24 is polydimethylsiloxane fluid sold by Dow Corning Corporation. The pressure sensor 26 may be part of an electronic control unit 30, hereafter ECU 30, which may include a protective housing for the pressure sensor 26. The pressure sensor 26 is in fluidic communication with and coupled to the bladder 24 by a hose 32, typically filled with the same fluid used to fill the bladder 24. The pressure sensor 26 is generally configured to provide a pressure signal 34 (FIG. 2) indicative of the occupant weight 20.

Continuing to refer to FIG. 1, the vehicle seat 10 may also include a seat orientation angle sensing means 36 configured to output an orientation angle signal indicative of a seat orientation angle. As will be explained in more detail below, the seat orientation angle sensing means may include an accelerometer 38 (FIG. 2) and a controller 40 configured to receive signals from the accelerometer 38 and determine a seat orientation angle signal based on those signals. It should be understood that the seat orientation for the arrangement illustrated is a value stored and/or processed by the controller 40. However other arrangement may be such that the seat orientation angle signal is present on an electrical conductor interconnecting the seat orientation angle sensing means to some other electrical device. When the seat orientation angle is known, the orientation angle signal may be used to compensate the weight signal to estimate an occupant weight. In the case where weight is indicated by the pressure signal 34, the orientation angle signal may be used to compensate the pressure signal 34 to estimate an occupant weight 20.

Figure 2:
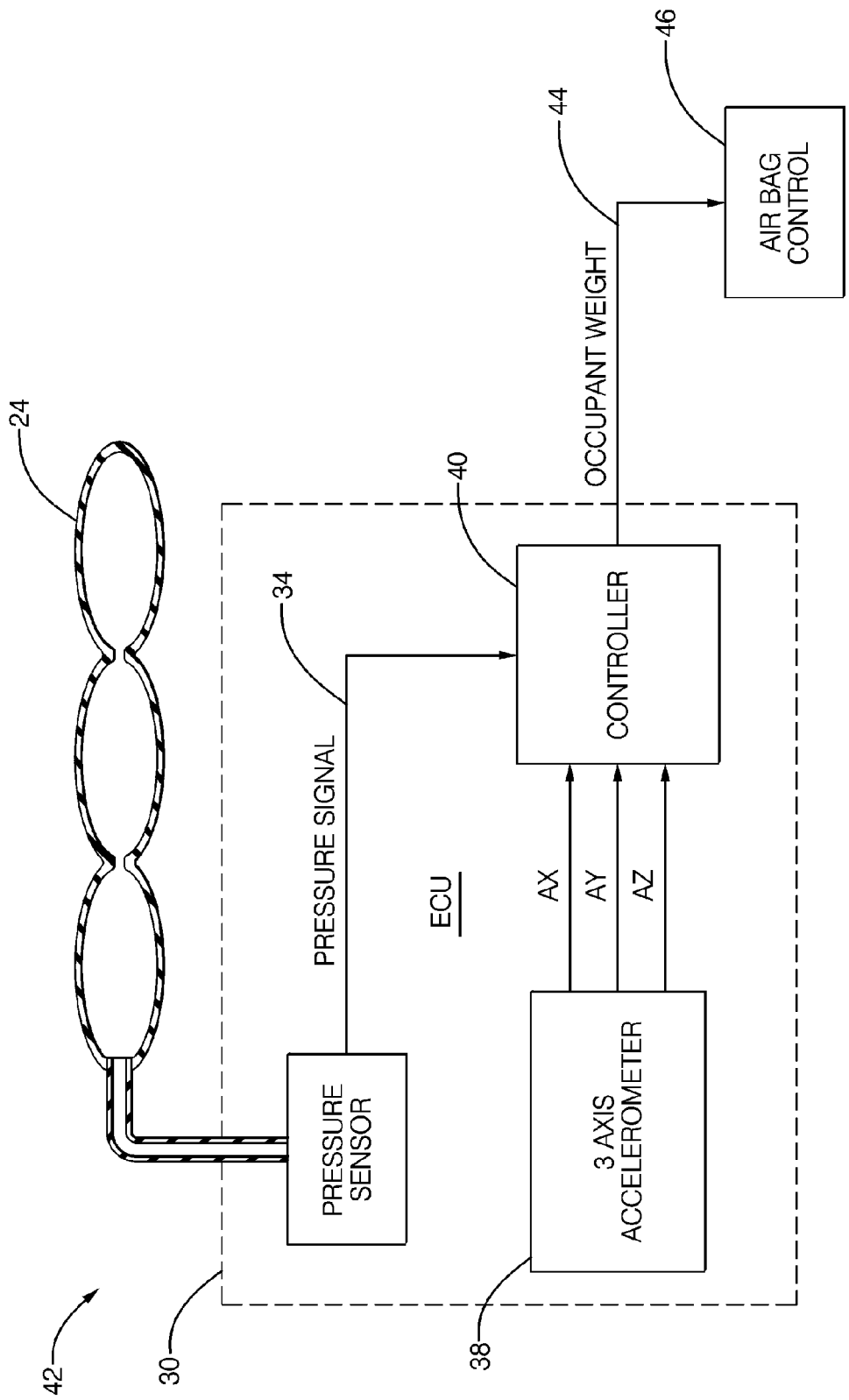
FIG. 2 is a block diagram of an occupant detection device in accordance with one embodiment.

FIG. 2 illustrates an embodiment of a weight based occupant detection device 42, hereafter device 42. The device 42 may include the electronic control unit (ECU) 30 suggested above. The device may also include a controller 40. The controller 40 may include a processor such as a microprocessor or other control circuitry as should be evident to those acquainted in the art. The controller 40 may include memory, including non-volatile memory, such as electrically erasable programmable read-only memory (EEPROM) for storing one or more routines, thresholds and captured data. The one or more routines may be executed by the processor to perform steps for determining if signals received by the controller 40 for estimating an occupant weight 20 as described herein. The controller 40 may also be configured to estimate an occupant weight value based on the weight signal or pressure signal 34, and the orientation angle signal, which may be based on signals from the accelerometer 38. The controller 40 may also be configured to output a occupant weight value or a seat occupied signal 44 to an airbag controller 46 to be used to enable or disable an airbag proximate to the vehicle seat 10.

As suggested above, the seat orientation angle sensing means may include an accelerometer 38. A suitable, non-limiting example of the accelerometer 38 may be a 3-axis accelerometer, for example, a model ADXL346 3-axis accelerometer from Analog Devices Inc. However it will be appreciated that an accelerometer having fewer than 3 axis of sensing may be used to provide some compensation of a signal indicative of occupant weight 20. By way of a non-limiting example, a single axis accelerometer configured to output a first acceleration signal may be used to estimate a forward/backward tilting (pitch angle) of the seat. Observations during testing of occupant detection devices such as device 42 suggest that knowing pitch angle is a dominate factor when estimating a seat orientation angle for compensating a weight signal. As another example, the accelerometer may be a 2-axis accelerometer that, depending on how the 2-axis accelerometer is oriented, may be used to determine pitch angle, and either roll angle or seat vertical acceleration value (heave). In this example, the controller 40 may be configured to estimate the occupant weight based on the weight signal, the seat orientation angle, and/or the seat vertical acceleration value.

It has been observed during testing of seat assemblies, such as vehicle seat 10, that the fluid pressure sensed by the pressure sensor 26 for indicating an occupant weight 20 changes when the orientation of the vehicle seat 10 relative to the vehicle 8 or direction of gravity is changed. The orientation can be changed by the occupant 16 adjusting the seat orientation relative to the vehicle 8 to be comfortable, or can be changed by the vehicle 8 traveling uphill or downhill. The test data indicates that a pressure signal from the pressure sensor 14 may vary by 10% of reading in response to a change in seat inclination angle of +/−15 degrees. Such a change may reduce the accuracy of classifying the size of a seat occupant. For example, a small adult residing on the seat may be classified as a child, and so the occupant protection device activation may be unnecessarily deactivated.

It has been suggested that vehicle seats having an arrangement of bladder 24 and pressure sensor 26 similar to that shown in FIG. 1 may influence the fluid pressure indicated by the pressure sensor 26 when the vehicle 8 experiences various dynamic accelerations such as longitudinal acceleration caused by the vehicle 8 accelerating from a stop to some speed or braking from some speed to a stop. Dynamic acceleration may also include lateral acceleration caused by the vehicle 8 executing a turn while traveling at some speed. An analysis indicates that the arrangement shown in FIG. 1 may exhibit a 20% of full scale variation of the pressure signal 34 during accelerations typically experienced during vehicle operation.

The effect of seat orientation on occupant weight and how to compensate the indication of occupant weight from the weight sensing means 18 will now be further described by way of examples. When the seating surface is at a reference orientation, for example, the seating surface is normal or perpendicular to the direction of the force of gravity, the occupant weight 20 may be fully applied to the weight sensing means 18. However, if the vehicle seat 10 is tipped backward, the weight applied to the sensor is reduced as the seat orientation angle increases. While not subscribing to any particular theory, the amount of compensation applied to the pressure signal 34 may be based simply on the tilt angle and so the compensation may be based on known trigonometric functions. However, some of the unloading of the weight sensing means 18 may be due to the seat back supporting a portion of the occupant, particularly if the seat backrest is in a reclined position. As such the vehicle seat 10 may also include a means to determine an orientation angle for the backrest relative to the seating surface 14. It follows then that more sophisticated formulas may be required, or the correction may be performed by referring to look-up tables stored in the controller that were developed through empirical testing.

In one embodiment, the ECU 30 may include a 3-axis accelerometer mounted on printed circuit board (PCB) within the ECU housing. The accelerometer is preferably mounted in such a way so the accelerometer senses static and dynamic accelerations along three perpendicular axes. This 3-axis data may be used to compensate the sensed weight value for any orientation angles relative to the reference or level position of the vehicle seat 10. It will be recognized by those skilled in the art that a 3-axis accelerometer may be used to resolve an orientation angle that does not reside strictly along one axis. The three signals from the accelerometer (VX, VY, VZ) may be received by the controller 40. It is noted that the ECU that may also include a vehicle serial communication capability and/or other features useful for detecting and communicating that an occupant 16 is present on the vehicle seat 10, and estimating an occupant weight 20 of the occupant 16.

In another embodiment, the ECU 30 may receive signals from a seat back rest angle means 48, such as a second 3-axis accelerometer placed in the seat backrest. The seat backrest inclination data may provide additional information to be used to calculate the true weight of the occupant as a function of the unloading of the seat bottom cushion due to some of the occupant weight being partially supported by an reclined seat backrest. In another embodiment, the ECU 30 may receive data from an Inertia Measurement Unit (IMU) if the vehicle is so equipped with such device. It will be appreciated that the IMU vehicle data would also need to be as comprehensive as the local 3-axis accelerometer in the ECU. It will be appreciated that since the 3-axes of the accelerometer are orthogonal to each other, the root sum square value should be equal to one under normal gravity conditions.

$$RSS = \sqrt{V_x^2 + V_y^2 + V_z^2} \qquad \text{Equation 1}$$

RSS values greater than 1 are indicative of vehicle dynamic operation and other movements resulting in accelerations of the seat and occupant in addition to gravity. These conditions would be detectable with this approach, and the RSS value could be used as qualifier in a logical filter to disable updates of sensor data during these induced and often transient conditions. Prolonged situations that, for example, may include these additional accelerations are: spiral roads or mountain ascents/descents would be recognized and the data compensated for these abnormal conditions.

Figure 3:
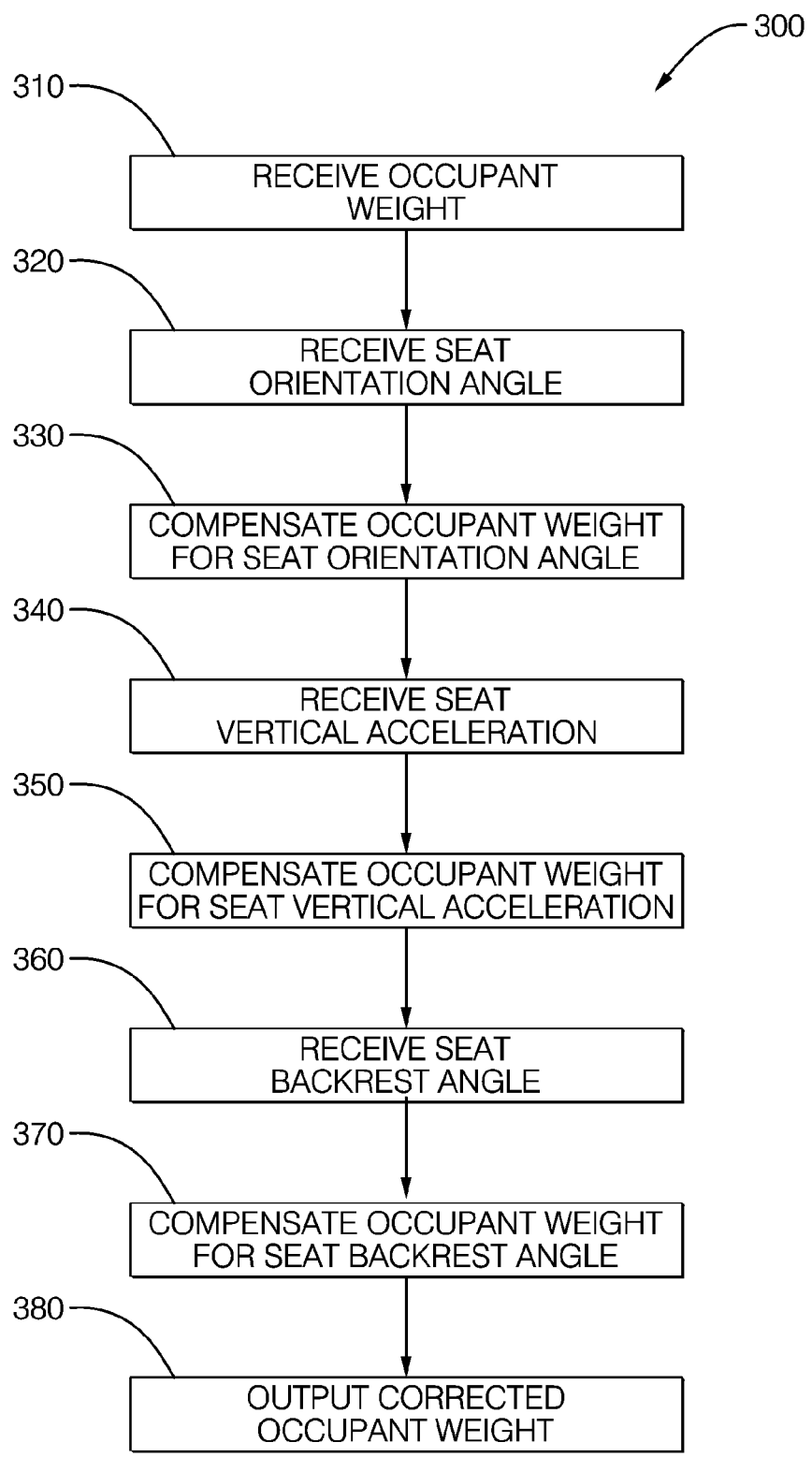
FIG. 3 is a flowchart of a method to operate an occupant detection device in accordance with one embodiment.

FIG. 3 illustrates a flowchart of a method 300 of operating a weight based occupant detection device. The method 300 may include the following steps. At step 310, RECEIVE OCCUPANT WEIGHT, the ECU 30 may receive an indication of an occupant weight from a weight sensing means 18 installed in a vehicle seat. As described above, the indication of occupant weight may be a pressure signal 34 from a pressure sensor 26 coupled to a bladder 24. However, it will be readily recognized that there are other ways to provide an indication of occupant weight such as sensing occupant weight with a strain-gauge.

At step 320, RECEIVE SEAT ORIENTATION ANGLE, the ECU 30 or the controller 40 may receive an indication of a seat orientation angle of the vehicle seat 10 from the seat orientation angle sensing means 36. As described above, the indication of the seat orientation angle of the vehicle seat may be provided by an accelerometer coupled 38 to the vehicle seat 10, optionally located within an ECU housing. However, it will be readily recognized that there are other ways to provide an indication of seat orientation angle such as using potentiometers mechanically coupled to the vehicle seat to measure a seat orientation angle relative to the vehicle 8, or a device that directly measures angles, such as an electronic bubble level.

At step 330, COMPENSATE OCCUPANT WEIGHT FOR SEAT ORIENTATION ANGLE, the controller 40 may estimate an occupant weight 20 of an occupant 16 residing on the vehicle seat 10 by compensating the indication of occupant weight 20 from the weight sensing means 18 in accordance with the indication of a seat orientation angle from the seat orientation angle sensing means 36, and thereby compensate the occupant weight indicated by the weight sensing means 18 for seat orientation angle.

At step 340, RECEIVE SEAT VERTICAL ACCELERATION, the ECU 30 or the controller 40 may receive an indication of a seat vertical acceleration from the accelerometer 38. At step 350, COMPENSATE OCCUPANT WEIGHT FOR SEAT VERTICAL ACCELERATION, the controller 40 may compensate an estimate of an occupant weight 20 of an occupant 16 residing on the vehicle seat 10 in accordance with the indication of a seat vertical acceleration, and thereby compensate the indicated occupant weight for seat vertical acceleration. For example, if the seat vertical acceleration is upward, then the indicated weight of the occupant 16 may be greater than the actual weight of the occupant 16. Likewise, if the seat vertical acceleration is downward, then the indicated weight of the occupant 16 may be less than the actual weight of the occupant 16.

At step 360, RECEIVE SEAT BACKREST ANGLE, the ECU 30 or the controller 40 may receive an indication of an indication of a seat backrest angle. The seat backrest angle may come from a seat backrest angle means 48 illustrated in FIG. 1. The seat backrest angle means 48, may include an electronic bubble level, or a potentiometer coupled to the seat backrest and configured to sense or measure the seat backrest angle. As described above, if the seat backrest is in a reclined position, then the occupant weight indicate by the weight sensing means 18 may be less than the actual occupant weight 20. At step 370, COMPENSATE OCCUPANT WEIGHT FOR SEAT BACKREST ANGLE, the controller 40 may estimate an occupant weight 20 of an occupant 16 residing on the vehicle seat 10 based on the seat backrest angle, and thereby compensate the indicated occupant weight for the seat backrest angle.

At step 380, OUTPUT CORRECTED OCCUPANT WEIGHT, the ECU 30 may output a signal to an airbag controller 46 to enable or disable the airbag based on the weight 20 of the occupant 16. The signal output to the airbag controller 46 may communicate the estimated weight of the occupant 16, or may indicate that the occupant 16 has been assigned a classification such as full-sized adult, or child.

Accordingly, a device 42 and a vehicle seat 10, and a method 300 are provided for determining an estimate of an occupant weight. Static as well as dynamic vehicle and seat orientation angle may be determined and this data used to adjust or compensate the measured bladder fluid pressure for the conditions that may cause the bladder fluid to not accurately indicate occupant weight.

While this invention has been described in terms of the preferred embodiments thereof, it is not intended to be so limited, but rather only to the extent set forth in the claims that follow.

We claim:
1. A weight based occupant detection device comprising:
   a weight sensing means installed in a vehicle seat in a manner effective to sense weight on a seating surface, said weight sensing means configured to output a weight signal;

a seat orientation angle sensing means configured to indicate a seat bottom orientation angle;
a seat backrest angle sensing means configured to indicate a seat backrest angle; and
a controller configured to estimate an occupant weight value based on the weight signal, the seat bottom orientation angle signal, and the seat backrest angle.

2. The device in accordance with claim 1, wherein the seat orientation angle sensing means comprises an accelerometer.

3. The device in accordance with claim 2, wherein the accelerometer is a 3-axis accelerometer.

4. The device in accordance with claim 2, wherein a first acceleration signal from the accelerometer is used to estimate the seat orientation angle.

5. The device in accordance with claim 4, wherein a second acceleration signal from the accelerometer is used to estimate a seat vertical acceleration value.

6. The device in accordance with claim 5, wherein the device further comprises a controller configured to estimate the occupant weight based on the weight signal, the seat orientation angle, and the seat vertical acceleration value.

7. The device in accordance with claim 1, wherein the weight sensing means comprises a bladder and a pressure sensor.

8. A vehicle seat comprising:
a seat cushion configured to define a seating surface;
a weight sensing means installed in the vehicle seat in a manner effective to sense weight on the seating surface, said weight sensing means configured to output a weight signal indicative of an occupant weight of a seat occupant residing on the vehicle seat; and
a seat orientation angle sensing means configured to output an orientation angle signal indicative of a seat bottom orientation angle, wherein the orientation angle signal is used to compensate the weight signal to estimate an occupant weight value; and
a seat backrest angle sensing means configured to indicate a seat backrest angle, wherein the seat backrest angle signal is also used to compensate the weight signal to estimate the occupant weight value.

9. The device in accordance with claim 8, wherein the device further comprises a controller configured to estimate an occupant weight value based on the weight signal and the orientation angle signal.

10. The device in accordance with claim 8, wherein the seat orientation angle sensing means comprises an accelerometer.

11. The device in accordance with claim 10, wherein the accelerometer is a 3-axis accelerometer.

12. The device in accordance with claim 10, wherein a first acceleration signal from the accelerometer is used to estimate the seat orientation angle.

13. The device in accordance with claim 12, wherein a second acceleration signal from the accelerometer is used to estimate a seat vertical acceleration value.

14. The device in accordance with claim 13, wherein the device further comprises a controller configured to estimate the occupant weight based on the weight signal, the seat orientation angle, and the seat vertical acceleration value.

15. A method of operating a weight based occupant detection device comprising the steps of:
receiving an indication of an occupant weight from a weight sensing means installed in a vehicle seat;
receiving an indication of a seat bottom orientation angle of the vehicle seat;
receiving an indication of a seat backrest angle; and
estimating an occupant weight of an occupant residing on the vehicle seat based on the indication of occupant weight, the indication of a seat bottom orientation angle, and the indication of a seat backrest angle.

16. The method in accordance with claim 15, wherein said method further comprises the step of receiving an indication of a seat vertical acceleration, and wherein the step of estimating the occupant weight is also based on the indication of a seat vertical acceleration.

\* \* \* \* \*